United States Patent
Uchi et al.

(10) Patent No.: US 8,839,925 B2
(45) Date of Patent: Sep. 23, 2014

(54) FLUID TRANSMITTING DEVICE WITH LOCK-UP CLUTCH

(75) Inventors: Naoto Uchi, Shizuoka (JP); Yoshinori Sugimoto, Shizuoka (JP); Kengo Suzuki, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 253 days.

(21) Appl. No.: 13/364,831

(22) Filed: Feb. 2, 2012

(65) Prior Publication Data

US 2012/0285782 A1 Nov. 15, 2012

(30) Foreign Application Priority Data

May 13, 2011 (JP) ................................. 2011-107924

(51) Int. Cl.
*F16H 45/02* (2006.01)
*F16F 15/123* (2006.01)

(52) U.S. Cl.
CPC .............. *F16H 45/02* (2013.01); *F16F 15/1232* (2013.01); *F16H 2045/0294* (2013.01); *F16H 2045/0205* (2013.01); *F16H 2045/0221* (2013.01)
USPC ........................... 192/3.29; 192/205; 192/212

(58) Field of Classification Search
USPC ........................................................ 192/205
See application file for complete search history.

(56) References Cited

U.S. PATENT DOCUMENTS

| 5,810,140 A | 9/1998 | Billet et al. |
| 2003/0106756 A1* | 6/2003 | Sato et al. ..................... 192/3.29 |
| 2010/0001152 A1* | 1/2010 | Golle et al. ..................... 72/339 |

FOREIGN PATENT DOCUMENTS

| JP | 2-138261 U | 11/1990 |
| JP | 9-501484 A | 2/1997 |
| JP | 2003-148590 A | 5/2003 |

* cited by examiner

*Primary Examiner* — Rodney H Bonck
(74) *Attorney, Agent, or Firm* — Arent Fox LLP

(57) ABSTRACT

In a fluid transmitting device with a lock-up clutch, each second transmitting claw is formed of: a base portion having a long side arranged in a peripheral direction of a turbine impeller and a short side arranged axially of the turbine impeller; and a claw portion protruding from an intermediate portion of one of long-side portions of the base portion and being inserted between adjacent damper springs, and each short-side portion of the base portion is fixed to the turbine impeller through a weld. A long-side portion of the base portion not welded to the turbine impeller includes a cutout, facilitating bend of the long-side portion when transmitting torque through the second transmitting claw, at opposite sides of the claw portion. This improves engine output performance by relaxing stress concentration at spots where the second claws are welded to a turbine impeller without increasing the thicknesses of the claws.

5 Claims, 7 Drawing Sheets

FLUID TRANSMITTING DEVICE WITH LOCK-UP CLUTCH

BACKGROUND OF THE INVENTION

1. Field of the Invention

The present invention relates to an improvement of a fluid transmitting device with a lock-up clutch, in which a plurality of damper springs are arranged in an annular shape and housed in an annular spring housing groove formed in a clutch piston of a lock-up clutch, a plurality of first transmitting claws each inserted between corresponding adjacent ones of the damper springs are provided to the clutch piston, and a plurality of second transmitting claws each facing a corresponding one of the first transmitting claws and inserted between the adjacent damper springs are provided to a turbine impeller.

2. Description of the Related Art

The applicant has already proposed a structure of such a fluid transmitting device with a lock-up clutch by which the second transmitting claws can be manufactured with a good yield and are applicable in common to various fluid transmitting devices of different specifications, leading to a remarkable reduction in cost, and in the welding of the second transmitting claws to the turbine impeller, the quantity of heat applied to the turbine impeller can be minimized, thereby suppressing the thermal strain of the turbine impeller. In the structure, each of the second transmitting claws is formed of: a claw portion inserted between the adjacent damper springs; and a substantially rectangular base portion integrally connected to the root of the claw portion, and having its long side arranged in the peripheral direction of the turbine impeller and its short side arranged in the axial direction of the turbine impeller. Moreover, both short-side portions of the base portion are fixed to the turbine impeller by welding (see Japanese Patent Application Laid-open No. 2003-148590).

However, in the fluid transmitting device with a lock-up clutch having the above structure, there may be an increase in the stress concentrated at the spots where the second transmitting claws are welded to the turbine impeller, due to improvement in engine output performance. Thus, reinforcing the welding spots has become necessary. To this end, it is conceivable to increase the thickness of each second transmitting claw, but doing so increases the weight of the second transmitting claw and eventually increases the weight of the transmitting device. Such an increase will affect the fuel consumption of the engine.

SUMMARY OF THE INVENTION

The present invention has been made in view of such a circumstance and has an object to provide a fluid transmitting device with a lock-up clutch capable of coping with improvement in engine output performance by relaxing stress concentration at spots where second transmitting claws are welded to a turbine impeller without increasing the thicknesses of the second transmitting claws.

In order to achieve the object, according to a first aspect of the present invention, there is provided a fluid transmitting device with a lock-up clutch, in which a plurality of damper springs are arranged in an annular shape and housed in an annular spring housing groove formed in a clutch piston of a lock-up clutch, a plurality of first transmitting claws each inserted between corresponding adjacent ones of the damper springs are provided to the clutch piston, a plurality of second transmitting claws each facing a corresponding one of the first transmitting claws and inserted between the adjacent damper springs are fixed to a turbine impeller, the second transmitting claws being made of a steel sheet and provided separately and independently of each other, each of the second transmitting claws is formed of a base portion and a claw portion, the base portion having a long side arranged in a peripheral direction of the turbine impeller and a short side arranged in an axial direction of the turbine impeller, the claw portion protruding from an intermediate portion of one of long-side portions of the base portion and being inserted between the adjacent damper springs, and each of short-side portions of the base portion is fixed to the turbine impeller through a weld, wherein the one long-side portion of the base portion that is not welded to the turbine impeller includes a cutout at opposite sides of the claw portion, the cutout facilitating bend of the long-side portion at the time of transmitting torque through the second transmitting claw.

According to the first aspect of the present invention, the long-side portion of the base portion, which is not welded to the turbine impeller, is provided with the cutout at the opposite sides of the claw portion. Thus, in the transfer of large torque between the turbine impeller and the damper springs through the second transmitting claw, the base portion bends around the cutout, thereby relaxing stress concentration at the spots where both short-side portions are fixed to the turbine impeller through the welds. This makes it possible to improve the durability of the second transmitting claw without increasing the thickness of the second transmitting claw.

According to a second aspect of the present invention, in addition to the first aspect, the cutout is formed in an arc shape continuous with a root of the claw portion.

According to the second aspect of the present invention, each cutout is formed in an arc shape. Thus, the stress can be distributed around a relatively broad, arc-shaped portion of the cutout, thereby effectively enhancing the durability of the second transmitting claw.

According to a third aspect of the present invention, in addition to the first aspect, the cutout is provided away from a root of the claw portion.

According to the third aspect of the present invention, in the transfer of large torque between the turbine impeller and the damper springs through the second transmitting claw, stress concentration occurring in the base portion can be distributed to the root of the claw portion and around each cutout, thereby effectively enhancing the durability of the second transmitting claw.

According to a fourth aspect of the present invention, in addition to the first aspect, the cutout has a plurality of corner portions.

According to the fourth aspect of the present invention, in the transfer of large torque between the turbine impeller and the damper springs through the second transmitting claw, stress concentration occurring in the base portion can be distributed around the multiple corner portions of each cutout, thereby effectively enhancing the durability of the second transmitting claw.

According to a fifth aspect of the present invention, in addition to the first aspect, a plurality of the cutouts are provided to the long-side portion at each of the opposite sides of the claw portion.

According to the fifth aspect of the present invention, in the transfer of large torque between the turbine impeller and the damper springs through the second transmitting claw, stress concentration occurring in the base portion can be distributed around the multiple cutouts at each of the opposite sides of the claw portion, thereby effectively enhancing the durability of the second transmitting claw.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Figure 1:
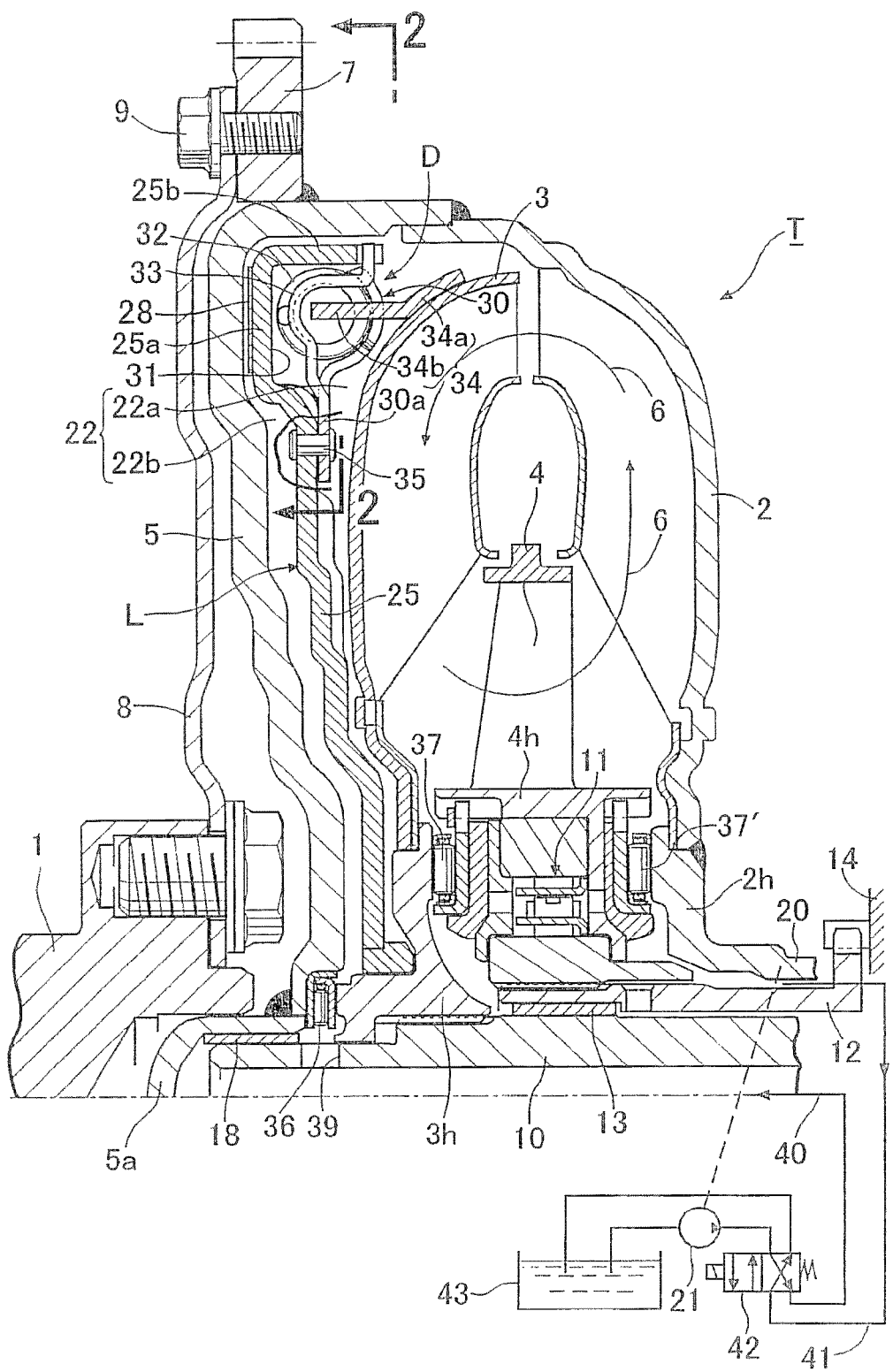
FIG. 1 is a longitudinal sectional side view of a torque converter with a lock-up clutch according to a first embodiment of the present invention.

First of all, a first embodiment of the present invention shown in FIGS. 1 to 4 will be described. In FIG. 1, a torque converter T as a fluid transmitting device includes a pump impeller 2, a turbine impeller 3 disposed facing the pump impeller 2, and a stator impeller 4 disposed between inner peripheral portions of the pump impeller 2 and turbine impeller 3. These three impellers 2, 3, and 4 define therebetween a circulation circuit 6 through which to transmit power by means of hydraulic oil.

A side cover 5 covering the outer surface of the turbine impeller 3 is integrally coupled to the pump impeller 2 by welding. A starter ring gear 7 is welded to the outer peripheral surface of the side cover 5, and a drive plate 8 joined to a crankshaft 1 of an engine is fixed to this ring gear 7 with a bolt 9. A thrust needle bearing 36 is interposed between a hub 3$h$ of the turbine impeller 3 and the side cover 5.

An output shaft 10 aligned coaxially with the crankshaft 1 is disposed in a center portion of the torque converter T. This output shaft 10 is spline-fitted to the hub 3$h$ of the turbine impeller 3 and is rotatably supported on a support tube 5$a$ in a center portion of the side cover 5 through a bearing bush 18. The output shaft 10 serves as a main shaft of an unillustrated multi-stage transmission.

A cylindrical stator shaft 12 supporting a hub 4$h$ of the stator impeller 4 through a freewheel 11 is disposed around the outer periphery of the output shaft 10. A bearing bush 13 is interposed between the output shaft 10 and the stator shaft 12 to permit relative rotation thereof. An outer end portion of the stator shaft 12 is supported on a transmission case 14 in a non-rotatable manner.

Thrust needle bearings 37 and 37' are interposed respectively between the hub 4$h$ of the stator impeller 4 and the hubs 2$h$ and 3$h$ of the pump impeller 2 and turbine impeller 3 facing the hub 4$11$. Moreover, an auxiliary drive shaft 20 joined to the pump impeller 2 is disposed around the outer periphery of the stator shaft 12 in such a manner as to be capable of relative rotation. This auxiliary drive shaft 20 drives an oil pump 21 that supplies hydraulic oil to the torque converter T.

The turbine impeller 3 and the side cover 5 define a clutch chamber 22 therebetween, in which a lock-up clutch L allowing direct coupling of the turbine impeller 3 and the side cover 5 is housed. A clutch piston 25 constituting a main part of the lock-up clutch L is disposed in the clutch chamber 22 in such a manner as to divide the clutch chamber 22 into an inner chamber 22$a$ on the turbine impeller 3 side and all outer chamber 22$b$ on the side cover 5 side. This clutch piston 25 has an annular, flat portion 25$a$ bulging toward the side cover 5, and a rim 25$b$ bent from the outer peripheral edge of the flat portion 25$a$ toward the turbine impeller 3. A friction lining 28 facing the inner surface of the side cover 5 is attached to the flat portion 25$a$. The clutch piston 25 is slidably supported on the outer peripheral surface of the hub 3$11$ of the turbine impeller 3 such that the clutch piston 25 can move in the axial direction between a connected position at which the friction lining 28 is in pressure contact with the inner surface of the side cover 5 and a disconnected position at which the friction lining 28 is spaced apart from the inner wall.

Figure 2:
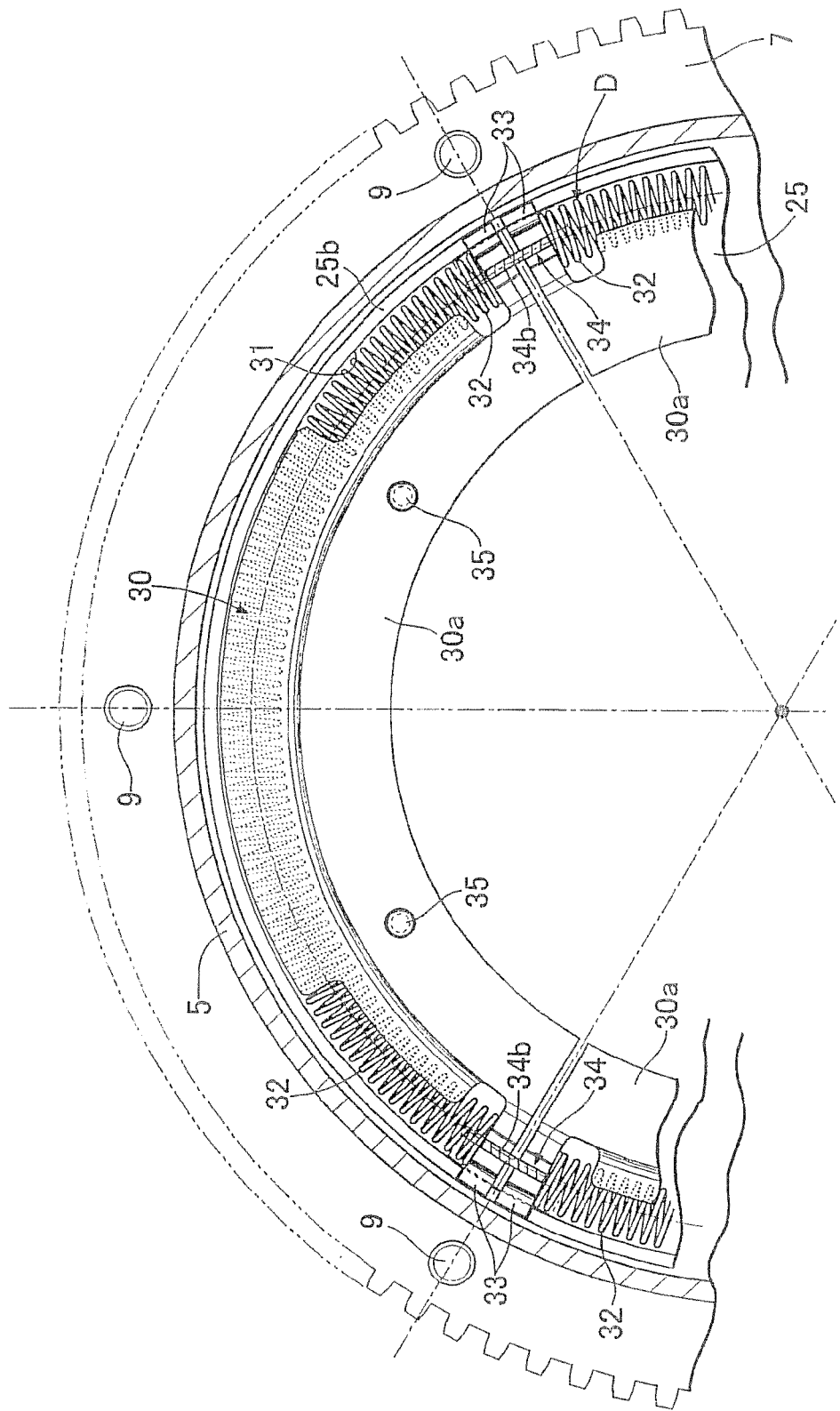
FIG. 2 is a sectional view taken along a line 2-2 in FIG. 1.

As shown in FIGS. 1 and 2, in the clutch chamber 22, a torque damper D is placed which couples the clutch piston 25 and the turbine impeller 3 in a cushioned manner. This torque damper D is formed of an annular spring holding member 30, multiple (three in the illustrated example) coil-shaped damper springs 32, multiple (the some number as the damper springs 32) first transmitting claws 33, and multiple (the same number as the damper springs 32) second transmitting claws 34. The annular spring holding member 30 is fixed to the clutch piston 25 with rivets 35 so as to define an annular spring housing groove 31 in cooperation with the rim 25$b$ of the clutch piston 25. The damper springs 32 are housed in the spring housing groove 31 and arranged in an annular shape therein. The first transmitting claws 33 are each formed on the spring holding member 30 and inserted between the corresponding adjacent damper springs 32. The second transmitting claws 34 are each welded to the outer peripheral surface of the turbine impeller 3 and inserted between the corresponding adjacent damper springs 32 while facing the corresponding first transmitting claw 33. In the illustrated example, the annular spring holding member 30 is formed of multiple fan-shaped pieces 30$a$ obtained by dividing the spring holding member 30 at a center portion of each first transmitting claw 33 in the peripheral direction.

Figure 3:
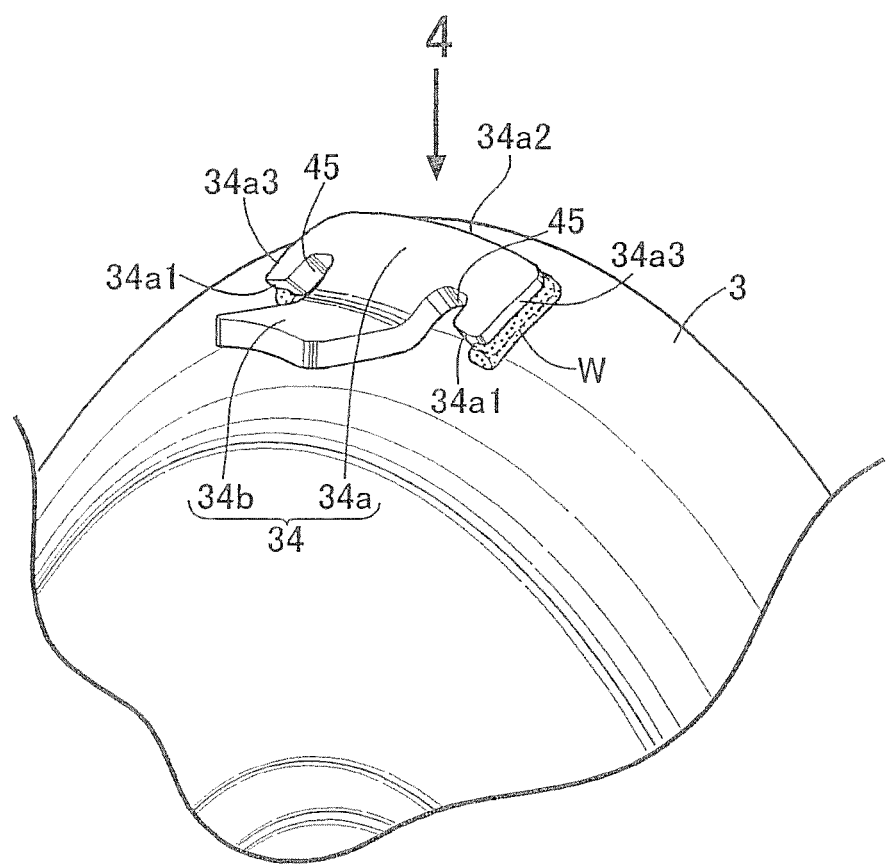
FIG. 3 is a perspective view showing a part of a turbine impeller and a second transmitting claw fixed thereto.
Figure 4:
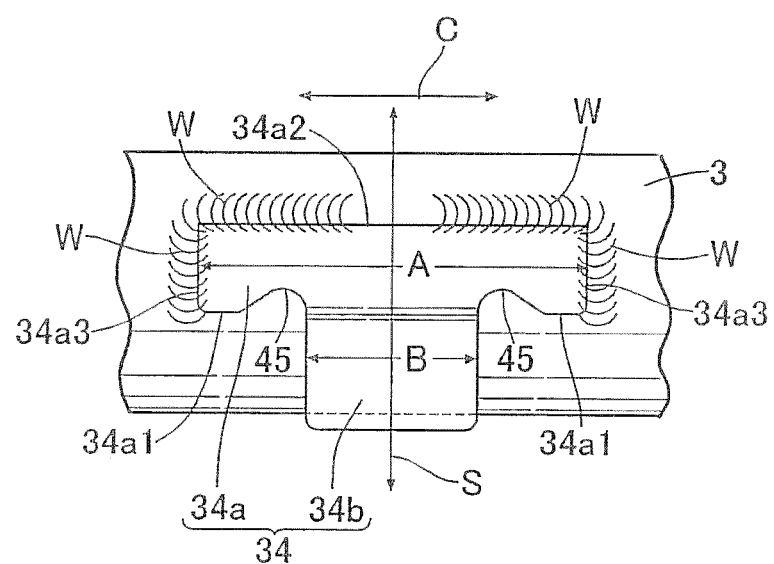
FIG. 4 is a view (plan view) seen from a direction of an arrow 4 in FIG.

As clearly shown in FIGS. 2 to 4, the second transmitting claws 34 are manufactured separately and independently of each other by punching a steel sheet and are each formed in a T shape by including a base portion 34$a$ and a claw portion 34$b$. The base portion 34$a$ has its long side arranged in a peripheral direction C of the turbine impeller 3 and its short side arranged in an axial direction S of the turbine impeller 3. The claw portion 34$b$ protrudes from an intermediate portion of a first long-side portion 34$a$1 of the base portion 34$a$ and is inserted between the adjacent damper springs 32. Specifically, the base portion 34$a$ has a rectangular shape in which the two sides along the peripheral direction of the turbine impeller 3 are defined as first and second long-side portions 34$a$1 and 34$a$2, respectively, while the two sides along the axial direction of the turbine impeller 3 are defined as short-side portions 34$a$3 and 34$a$3, respectively. The claw portion 34$b$ protrudes from an intermediate portion of the first long-side portion 34$a$1.

In the fixing of each second transmitting claw 34 to the turbine impeller 3, both short-side portions 34$a$3 and 34$a$3 of the base portion 34$a$ are TIG-welded to the outer peripheral surface of the turbine impeller 3 through welds W over the entire lengths of the short-side portions 34$a$3 and 34$a$3. Moreover, the second long-side portion 34$a$2 is TIG-welded to the outer peripheral surface of the turbine impeller 3 through welds W at least at spots that are continuous with the short-side portions 34$a$3 and 34$a$3.

In this fixing, the first long-side portion 34a1 of the base portion 34a is left unwelded to the turbine impeller 3. Cutouts 45 and 45 are provided at the opposite sides of the claw portion 34b, thus making the base portion 34a more bendable around the cutouts 45 and 45. In the illustrated example, each cutout 45 is formed in an arc shape continuous with the root of the claw portion 34b.

Referring back to FIG. 1, in a center portion of the output shaft 10 a first oil passage 40 is provided which communicates with the outer chamber 22b of the clutch chamber 22 through a side hole 39 and the trust needle bearing 36. Moreover, between the auxiliary drive shaft 20 and the stator shaft 12, a second oil passage 41 is defined which communicates with an inner peripheral portion of the circulation circuit 6 through the thrust needle bearings 37 and 37' and the freewheel 11. The first oil passage 40 and the second oil passage 41 are connected respectively and switchably to the discharge side of the oil pump 21 and an oil reservoir 43 with the help of a lock-up control valve 42.

Next, an operation of this embodiment will be described.

When the engine is idling or operating in an extremely low speed range, an unillustrated electronic control unit controls the lock-up control valve 42 in such a way that the first oil passage 40 is connected to the discharge side of the oil pump 21 and the second oil passage 41 is connected to the oil reservoir 43 as shown in FIG. 1. Accordingly, the output torque of the crankshaft 1 of the engine is transmitted to the drive plate 8, the side cover 5, and the pump impeller 2, rotationally driving the pump impeller 2 and further driving the oil pump 21 as well. This causes the hydraulic oil discharged from the oil pump 21 to sequentially flow through the lock-up control valve 42, the first oil passage 40, the side hole 39, the thrust needle bearing 36, the outer chamber 22b of the clutch chamber 22, and the inner chamber 22a of the clutch chamber 22, and then to flow into the circulation circuit 6. After filling the circuit 6, the hydraulic oil sequentially flows through the thrust needle bearings 37 and 37' and the freewheel 11 to enter the second oil passage 41, and then flows back to the oil reservoir 43 through the lock-up control valve 42.

In the clutch chamber 22, the outer chamber 22b becomes higher in pressure than the inner chamber 22a due to the above-described flow of the hydraulic oil. This pressure difference pushes the clutch piston 25 in a direction in which the clutch piston 25 is separated from the inner wall of the side cover 5. Thus, the lock-up clutch L is brought into a disconnected state, permitting relative rotation of the pump impeller 2 and the turbine impeller 3. Accordingly, as the crankshaft 1 rotationally drives the pump impeller 2, the hydraulic oil filled in the circulation circuit 6 circulates inside the circulation circuit 6 as illustrated by arrows. The circulation transmits the rotational torque of the pump impeller 2 to the turbine impeller 3, thereby driving the output shaft 10.

Here, if torque multiplication is occurring between the pump impeller 2 and the turbine impeller 3, a corresponding reaction force is exerted on the stator impeller 4, and the stator impeller 4 is locked by the locking action of the freewheel 11.

After the torque multiplication is done, the stator impeller 4 starts to rotate together with the pump impeller 2 and the turbine impeller 3 in the same direction while letting the freewheel 11 run idle, due to the reversal of the direction of the torque which the stator impeller 4 receives.

Once the torque converter T reaches such a coupling phase, the electronic control unit switches the lock-up control valve 42. As a result, as opposed to the previous case, the hydraulic oil discharged from the oil pump 21 flows through the lock-up control valve 42 and the second oil passage 41 and then flows into the circulation circuit 6. After filling the circuit 6, the hydraulic oil enters the inner chamber 22a of the clutch chamber 22 to fill the inner chamber 22a as well. Meanwhile, the outer chamber 22b of the clutch chamber 22 is open to the oil reservoir 43 through the first oil passage 40 and the lock-up control valve 42. Thus, in the clutch chamber 22, the inner chamber 22a becomes higher in pressure than the outer chamber 22b. This pressure difference pushes the clutch piston 25 toward the side cover 5, bringing the friction lining 28 into pressure contact with the inner wall of the side cover 5. Accordingly, the lock-up clutch L is shifted to a connected state. Then, the rotational torque transmitted from the crankshaft 1 to the pump impeller 2 is mechanically transmitted to the turbine impeller 3 through the side cover 5, the clutch piston 25, the multiple first transmitting claws 33, the damper springs 32, and the multiple second transmitting claws 34, meaning that the pump impeller 2 and the turbine impeller 3 are in a directly coupled state. This makes it possible to efficiently transmit the output torque of the crankshaft 1 to the output shaft 10 and hence reduce fuel consumption. In this case, if abrupt torque fluctuation occurs between the pump impeller 2 and the turbine impeller 3, the damper springs 32 are compressed between the first and second transmitting claws 33 and 34. This compression allows relative rotation of the pump impeller 2 and the turbine impeller 3. As a result, the torque shock is absorbed.

Meanwhile, in the torque converter T with the lock-up clutch as described above, the multiple second transmitting claws 34, which are welded to the outer peripheral surface of the turbine impeller 3 and through which the transmission to the damper springs 32 is performed, are formed separately and independently of each other. Thus, a large number of second transmitting claws 34 can be punched out of a steel sheet at a good yield. Further, the number of the second transmitting claws 34 to be used and the pitch for attaching the second transmitting claws 34 may be freely selected in accordance with the specification of the torque converter T. Therefore, the second transmitting claws 34 are applicable to various torque converters T. These advantages can bring about a remarkable reduction in manufacturing cost.

Moreover, the multiple second transmitting claws 34 are welded to the outer peripheral surface of the turbine impeller 3 at spots spread over the outer peripheral surface. Thus, the quantity of heat the turbine impeller 3 receives is low, suppressing the thermal strain of the turbine impeller 3 to a significantly low level. Further, the multiple second transmitting claws 34 welded to the turbine impeller 3 are separated from each other, and there is nothing therebetween that blocks the flow of the hydraulic fluid. Thus, the flow of the hydraulic fluid to the lock-up clutch L is smooth, thereby contributing to improvement in the response thereof.

Furthermore, each second transmitting claw 34 is formed in a T shape by including: the base portion 34a having its long and short sides arranged respectively in the peripheral direction C and axial direction S of the turbine impeller 3; and the claw portion 34b protruding from an intermediate portion of the first long-side portion 34a1 of the base portion 34a and inserted between the adjacent damper springs 32. Both short-side portions 34a3 and 34a3 of the base portion 34a are fixed to the turbine impeller 3 through the welds W. Thus, a support span A of the second transmitting claw 34 in a rotation direction R is set larger than a width B of the claw portion 34b, so that the second transmitting claw 34 is strong enough to withstand the transfer of large torque between the turbine impeller 3 and the damper springs 32.

In addition, the first long-side portion 34a1 of the base portion 34a, which is not welded to the turbine impeller 3, is provided with the pair of cutouts 45 and 45 at the opposite sides of the claw portion 34b. Thus, in the transfer of large torque between the turbine impeller 3 and the damper springs 32 through the second transmitting claw 34, the base portion 34a bends around the cutouts 45 and 45, thereby relaxing stress concentration at the spots where both short-side portions 34a3 and 34a3 are fixed to the turbine impeller 3 through the welds W. This makes it possible to improve the durability of the second transmitting claw 34 without increasing the thickness of the second transmitting claw 34. By making each cutout 45 in an arc shape, the stress can be distributed around a relatively broad, arc-shaped portion of the cutout 45, thereby effectively enhancing the durability of the second transmitting claw 34.

Figure 5:
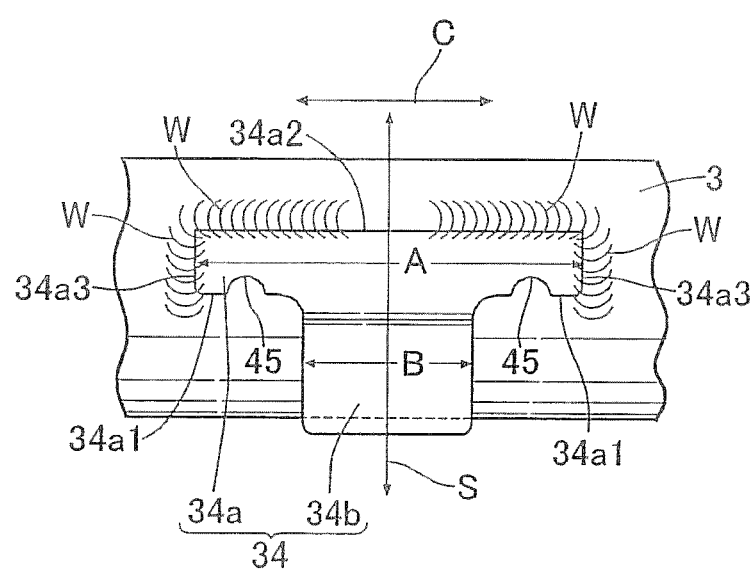
FIG. 5 is a view corresponding to FIG. 4 and showing a second embodiment of the present invention.

Next, a second embodiment of the present invention shown in FIG. 5 will be described.

In the second embodiment, in each second transmitting claw 34, the cutouts 45 and 45 are provided to the first long-side portion 34a1 of the base portion 34a at positions spaced apart from the root of the claw portion 34b. The other features of the configuration are the same as the previous embodiment. Thus, in FIG. 5, the portions corresponding to those in the previous embodiment are denoted by the same reference numerals, and overlapping descriptions are omitted.

According to the second embodiment, in the transfer of large torque between the turbine impeller 3 and the damper springs 32 through the second transmitting claw 34, stress concentration occurring in the base portion 34a can be distributed to the root of the claw portion 34b and around the cutouts 45 and 45, thereby effectively enhancing the durability of the second transmitting claw 34.

Figure 6:
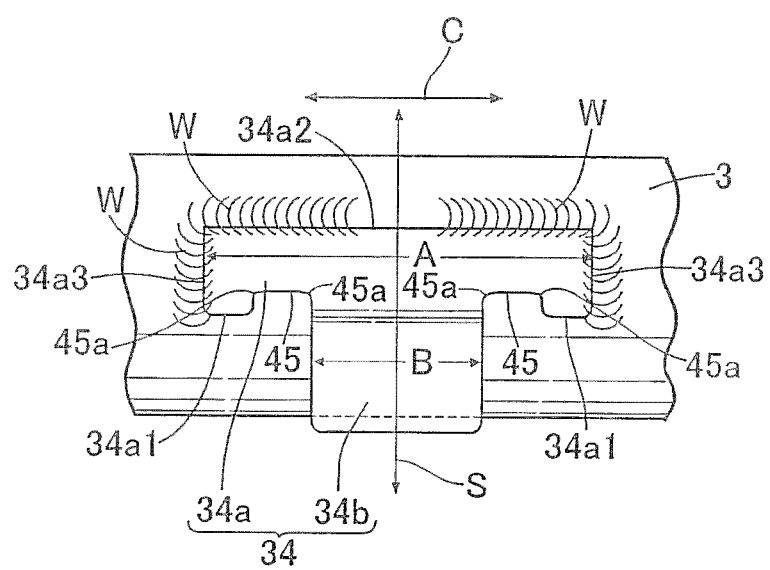
FIG. 6 is a view corresponding to FIG. 4 and showing a third embodiment of the present invention.

Next, a third embodiment of the present invention shown in FIG. 6 will be described.

In the third embodiment, in each second claw 34, the pair of cutouts 45 and 45 provided to the first long-side portion 34a1 of the base portion 34a are each formed in a polygonal shape having multiple (two in the illustrated example) corner portions 45a and 45a. The other features of the configuration are the same as the previous embodiments. Thus, in FIG. 6, the portions corresponding to those in the previous embodiments are denoted by the same reference numerals, and overlapping descriptions are omitted.

According to the third embodiment, in the transfer of large torque between the turbine impeller 3 and the damper springs 32 through the second transmitting claw 34, stress concentration occurring in the base portion 34a can be distributed around the multiple corner portions 45a and 45a of each cutout 45, thereby effectively enhancing the durability of the second transmitting claw 34.

Figure 7:
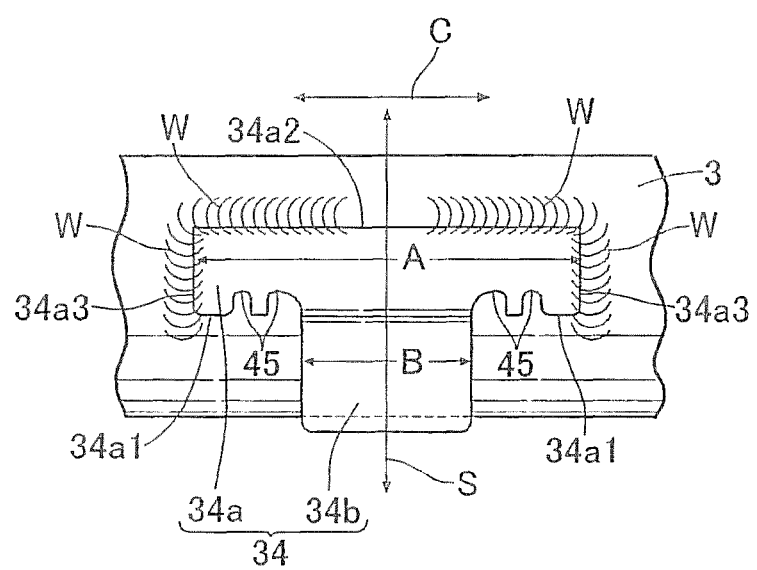
FIG. 7 is a view corresponding to FIG. 4 and showing a fourth embodiment of the present invention.

Next, a fourth embodiment of the present invention shown in FIG. 7 will be described.

In the fourth embodiment, multiple cutouts 45 are provided to the first long-side portion 34a1 of the base portion 34a at each of the opposite sides of the claw portion 34b. The other features of the configuration are the same as the previous embodiments. Thus, in FIG. 7, the portions corresponding to those in the previous embodiments are denoted by the same reference numerals, and overlapping descriptions are omitted.

According to the fourth embodiment, in the transfer of large torque between the turbine impeller 3 and the damper springs 32 through the second transmitting claw 34, stress concentration occurring in the base portion 34a can be distributed around the multiple cutouts 45 and 45 at each of the opposite sides of the claw portion 34b, thereby effectively enhancing the durability of the second transmitting claw 34.

The present invention is not limited to the above embodiments, and various design changes can be made without departing from the gist of the present invention. For example, the present invention is applicable to a fluid coupling without a stator impeller.

What is claimed is:

1. A fluid transmitting device with a lock-up clutch, in which
    a plurality of damper springs are arranged in an annular shape and housed in an annular spring housing groove formed in a clutch piston of a lock-up clutch,
    a plurality of first transmitting claws each inserted between corresponding adjacent ones of the damper springs are provided to the clutch piston,
    a plurality of second transmitting claws each facing a corresponding one of the first transmitting claws and inserted between the adjacent damper springs are fixed to a turbine impeller, the second transmitting claws being made of a steel sheet and provided separately and independently of each other,
    each of the second transmitting claws is formed of a base portion and a claw portion, the base portion having a long side arranged in a peripheral direction of the turbine impeller and a short side arranged in an axial direction of the turbine impeller, the claw portion protruding from an intermediate portion of one of long-side portions of the base portion and being inserted between the adjacent damper springs, and
    each of short-side portions of the base portion is fixed to the turbine impeller through a weld,
    wherein the one long-side portion of the base portion includes a cutout at opposite sides of the claw portion, the cutout facilitating bend of the long-side portion at the time of transmitting torque through the second transmitting claw.

2. The fluid transmitting device with a lock-up clutch according to claim 1 wherein the cutout is formed in an arc shape continuous with a root of the claw portion.

3. The fluid transmitting device with a lock-up clutch according to claim 1, wherein the cutout is provided away from a root of the claw portion.

4. The fluid transmitting device with a lock-up clutch according to claim 1, wherein the cutout has a plurality of corner portions.

5. The fluid transmitting device with a lock-up clutch according to claim 1, wherein a plurality of the cutouts are provided to the long-side portion at each of the opposite sides of the claw portion.

* * * * *